W. M. HORTON.
ELECTRICALLY OPERATED REFLECTOR FOR AUTOMOBILE HEADLIGHTS.
APPLICATION FILED DEC. 2, 1916.
1,321,443.
Patented Nov. 11, 1919.
2 SHEETS—SHEET 1.
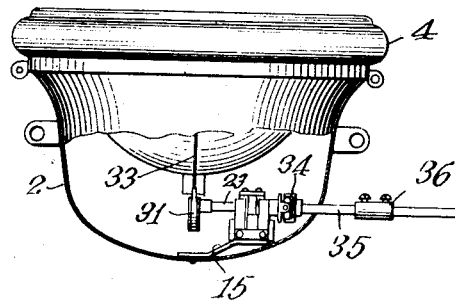
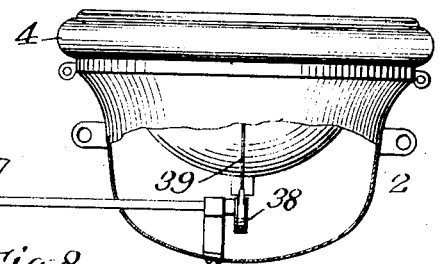
Fig. 1.
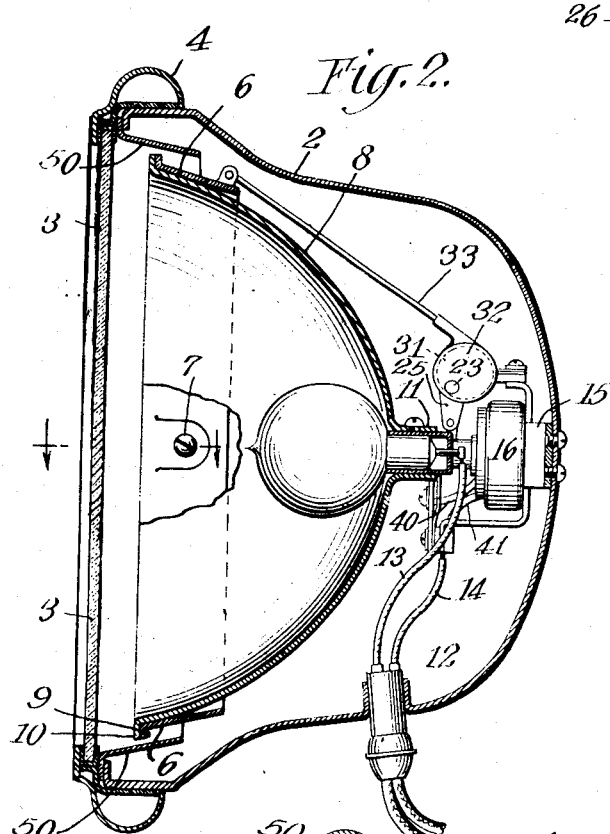
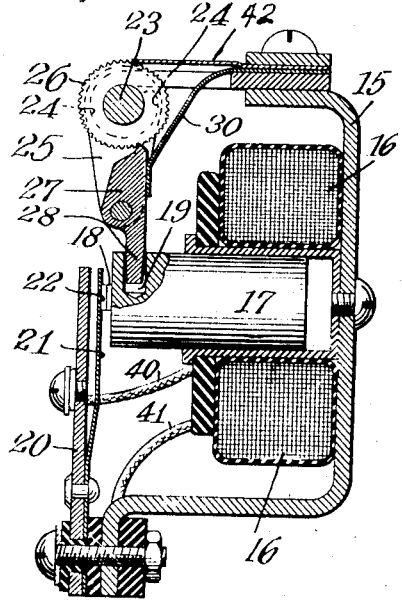
Fig. 2.  Fig. 8.  Fig. 3.
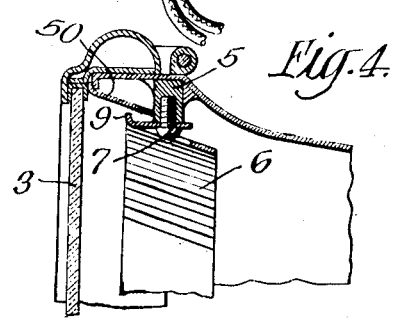
Fig. 4.
INVENTOR
William M. Horton
BY
ATTORNEY W. M. HORTON.
ELECTRICALLY OPERATED REFLECTOR FOR AUTOMOBILE HEADLIGHTS.
APPLICATION FILED DEC. 2, 1916.

1,321,443.

Patented Nov. 11, 1919.
2 SHEETS—SHEET 2.

INVENTOR
William M. Horton

BY
ATTORNEY

UNITED STATES PATENT OFFICE.

WILLIAM M. HORTON, OF CLEVELAND, OHIO, ASSIGNOR TO THE ADAMS-BAGNALL ELECTRIC COMPANY, OF CLEVELAND, OHIO, A CORPORATION OF OHIO.

ELECTRICALLY-OPERATED REFLECTOR FOR AUTOMOBILE-HEADLIGHTS.

1,321,443.　　　　Specification of Letters Patent.　　Patented Nov. 11, 1919.

Application filed December 2, 1916.　Serial No. 134,625.

*To all whom it may concern:*

Be it known that I, WILLIAM M. HORTON, a citizen of the United States, residing at Cleveland, in the county of Cuyahoga and State of Ohio, have invented certain new and useful Improvements in Electrically-Operated Reflectors for Automobile-Headlights, of which the following is a specification.

This invention relates to headlights, an automobile headlight being shown herein, it more particularly relating to an improved means for preventing the glare of such headlights, the object of the invention being to provide improved means for shifting the reflector of the headlight.

Another object of the invention is the provision of improved electrically operative means for shifting the reflector of the headlight.

A still further object of the invention is the provision of improved means whereby by the use of a single shifting instrumentality or mechanism, both reflectors of a pair of headlights may be simultaneously shifted.

A further object of the invention is the provision of improved means for connecting a pair of reflectors of a pair of headlights for simultaneous movement.

In the drawings accompanying and forming a part of this specification,

Figure 1 is a plan view, partly in section, of a pair of headlights, such as those usually used for automobiles with the reflectors thereof connected for simultaneous movement.

Fig. 2 is a vertical section of one of the improved headlights.

Fig. 3 is an enlarged detailed sectional view of the electric operating means for shifting the reflector, this view being taken on line 3—3 of Fig. 6.

Fig. 4 is a sectional detail view of a portion of Fig. 2.

Fig. 8 is a view of a simple mechanical means for operating the reflector.

Similar characters of reference indicate corresponding parts in the several figures of the drawings.

Figure 5:
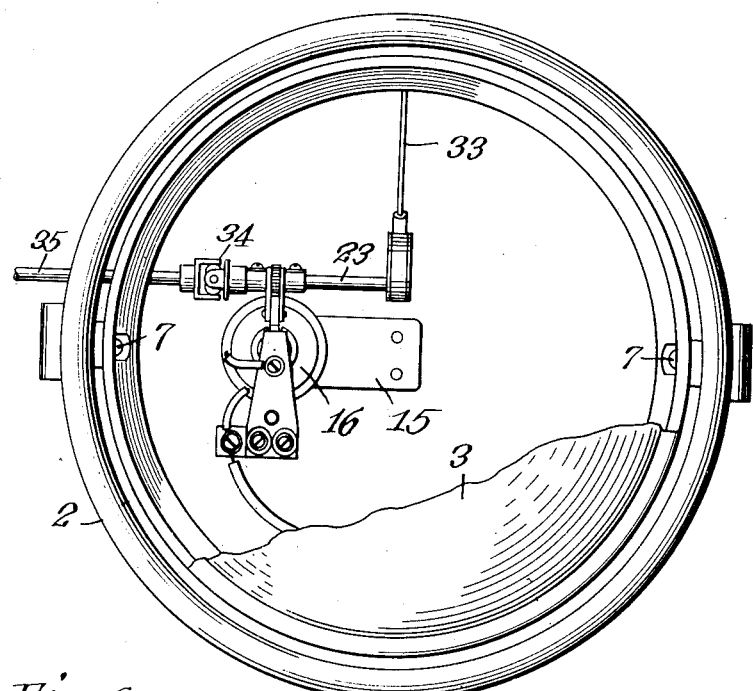
Fig. 5 is a front view of the lamp with a part of the reflector broken away to show the mechanism in the rear thereof.
Figure 6:
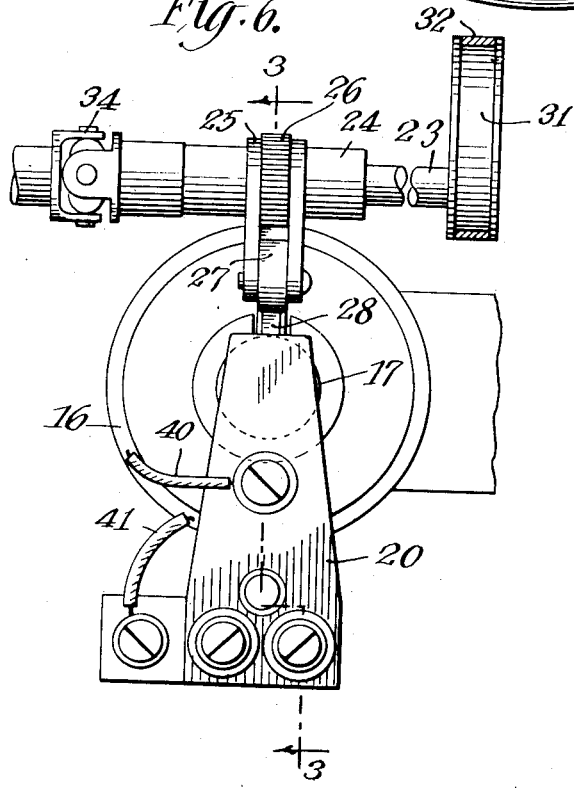
Fig. 6 is a front view of the structure shown in Fig. 3.
Figure 7:
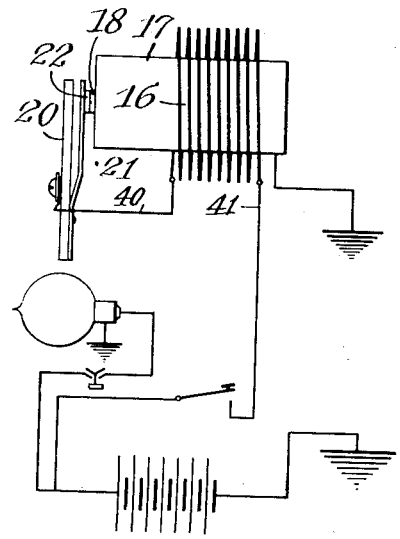
Fig. 7 is a diagrammatic view of the circuits.

In the present improvement, each headlight comprises a casing 2 of any suitable design or shape, having the usual lens or glass plate 3, shown in the present instance as carried by a swinging or removable door 4. Within the casing, which is provided with a pair of diametrically opposed lugs 5, there is located an annular ring or member 6 pivotally supported by suitable pivots or screws 7 on the lugs 5, and to this annular member or ring is secured the reflector 8 of any suitable form, the ring extending around the outer edge of the reflector and being outwardly flanged as at 9, to permit the attachment of the outwardly flanged portion 10 of the reflector thereto. By this method of supporting the reflector, it may be shifted up or down on its pivotal axis as occasion may require. The reflector is sleeved at its rear side as at 11 for the reception of the usual bulb and bulb socket or connection, so that the bulb of course moves with the reflector. The casing is provided with an opening as at 12 for the reception of a suitable connection, such as an Ediswan coupling or connection, shown in the present instance as a double connector, one wire as 13, of which, is attached to the bulb connection, while the other wire as 14 is attached to the electrical operating means about to be described. Carried by the casing at any suitable point in the rear of the reflector is a bracket 15 for supporting the actuating means for the reflector. Carried by this bracket is a suitable motor or electro-magnet 16, having a shiftable core 17, having at its forward end a contact portion 18 and in one side thereof a slot 19. Also carried by the bracket, at the forward side thereof, but insulated from the casing, is a rigidly supported upstanding member 20 carrying a spring contact member or armature 21, having a contact portion 22 adapted to make or break contact with the contact portion 18 of the core. A short shaft 23 is supported for rotation at the upper end of the bracket 15, and for which purpose the bracket 15 has secured thereto a pair of forwardly extending sleeved portions 24 provided with downwardly projecting arms or ears 25. Between these arms 25 and secured to the shaft is a ratchet wheel 26, with which a pawl 27 pivotally supported at the lower end of the depending arms 25 engages. The opposite end of this pawl projects as at 28 into the slot 19 of the core 17, whereby on the movement of the core back and forth, the pawl will be operated to shift the ratchet wheel, it being maintained in operative engagement with the ratchet wheel by a spring 30, which spring is secured to the bracket 15, and is in position to always return the core or plunger 17 to its forward position when it has been drawn to the rear or backward by the magnet. In other words, when the core or plunger 17 is drawn rearward or backward to break the contact with the contact member 21, the spring 30 immediately acts through the pawl 27 to return the core or plunger into position to make contact, so that when the mechanism is put in operation there is a continuous make and break between the contact portions of the core 17 and the member 21 for the purpose about to be described. Located on one end of the shaft 23 is an eccentric 31 shown herein as grooved to receive a strap 32, to which is connected an actuating rod 33 connected with the annular member or ring 6, preferably at the top thereof. Of course it will be understood the same result can be obtained by omitting the annular ring 6 and pivotally connecting the reflector itself to the lugs of the casing hereinbefore described, one object of using the ring being merely to facilitate the removal of the reflector in the usual manner without the removal of the pivotal connections of the ring, and which would be necessary if the reflector itself was pivotally connected to the casing. The opposite end of the shaft 23 has secured thereto a universal coupling 34 (see Figs. 5 and 6) of some suitable form, and to this coupling is secured a connecting rod 35, so that the shaft 23 thus forms a continuation of the rod which extends through the casing and is coupled by means of a coupling sleeve 36 to a similar rod 37, extending through the casing of the companion lamp. The end of this rod 37 is suitably supported within the casing of the companion lamp, and on the end of this rod is located a similar eccentric 38 to that hereinbefore described, which is connected in a similar way as at 39 to the reflector, whereby on the operation through the electric mechanism hereinbefore described of one reflector both will be simultaneously operative, the universal connection between the shaft 23 and the rod 35 being a flexible one, and thus permits the two reflectors to be simultaneously operative, while providing the necessary play between the shaft and the rod, so as not to interfere with the proper operation of the parts. The wire connection 14 hereinbefore referred to, leads to a suitable form of switch or push button located within the vehicle in any desired position, as on the steering wheel or on the dash board, while the wire 13 leads to the source of electrical energy as, for instance, a storage battery, while the magnet is connected by the usual electrical connections 40 and 41, which enable the same to be electrically energized on the manipulation of the switch, the necessary insulations of course being provided to prevent the short circuiting of the parts.

From the foregoing, it will be observed that when the magnet is energized, the core or plunger 17 will be drawn backward from the contact member 21, while the spring 30 immediately acts through the pawl 27 and returns the core to its contact position, thus insuring a make and break connection, as that the pawl moving with the core operates to turn the ratchet wheel fixed to shaft 23, and so turn both of the eccentrics to shift the reflectors from their horizontal positions into a position to throw the rays of the light downwardly to prevent the glare thereof, or upwardly as when going up a hill, or to see a long distance ahead as in country driving. The ratchet wheel is maintained against slipping backward by a suitable spring pawl 42, likewise carried by the bracket 15, so that the ratchet wheel can only move in one direction.

In practice, instead of manipulating the pawl 27 by the plunger 17, this may be readily done by connecting the pawl with a suitable wire or connecting rod running through the back of the casing (see, for instance, Fig. 8), whereby it may be pulled intermittently in one direction by the wire, while the spring 30 returns it in the opposite direction to thus operate the ratchet wheel, thus providing a very simple mechanical expedient for operating the reflectors.

It will be understood, of course, that the various details may be more or less changed without departing from the spirit or scope of the present improvement, which provides both a very simple mechanical as well as electrical means for operating one or both reflectors simultaneously to shift them upwardly or downwardly as may be required.

By reason of the fact that the reflector is pivotally supported for movement, it will be observed that one edge will, when the reflector is shifted, be brought nearer to the glass or lens than the other, so that the space between the casing and the reflector is increased so that the edge of the reflector can be seen when looking into the lamp, thus presenting an unsightly appearance. This also somewhat interferes with the diffusion or radiation of the light to the sides of the lamp. To avoid these disadvantages, I have provided a separate, and what is herein designated as an exterior reflector, in the form of a ring 50, which extends over the front edge of the casing and converges rearwardly around the flanged edge of the reflector and of the ring member when such is used, whereby on the shifting of the reflector the rays of light will strike this exterior reflector and be effectively radiated or diffused to the sides of the lamp, and as this exterior reflector is of comparatively short depth and has no rear portion, it does not radiate any rays of light which form a glare.

It may be said in conclusion, that a practical demonstration of the improvement has disclosed that the glare of headlights, so dangerous to on-coming vehicles or pedestrians, is positively prevented when the reflector is shifted to throw the light downward on the road, while at the same time the light thrown on the road is efficient to the full extent of such light, a distance of from forty to one hundred feet ahead of the car. In other words, by means of the present improvement, the full force of the light is obtained ahead of the vehicle without cutting off any of it, as by the use of masks or other accessories, while at the same time the dangerous glare so common in headlights as now used, is entirely eliminated, the present improvement having been approved as satisfactorily meeting all the requirements, and passed by the chief of police in one of the largest cities in this country, where the rules against the glare of headlights is rigidly enforced.

I claim is my invention:

1. The combination of a pair of headlight casings, a pair of reflectors shiftably supported therein, a pair of eccentrics connected to said reflectors, means connecting said eccentrics, and means for operating said eccentrics thereby to shift said reflectors simultaneously.

2. The combination of a pair of headlight casings, a pair of reflectors shiftably supported therein, a pair of eccentrics connected to said reflectors, means connecting said eccentrics, and electrically operative means for operating said eccentrics thereby to shift said reflectors simultaneously.

3. The combination of a pair of headlight casings, a pair of reflectors shiftably supported therein, a pair of eccentrics connected to said reflectors, a rod connecting said eccentrics, said rod having a flexible connection between adjacent parts thereon, and means for operating the rod.

4. The combination of a pair of headlight casings, a pair of reflectors shiftably supported therein, a pair of eccentrics connected to said reflectors, a rod connecting said eccentrics, and electrically operative means carried by one of the casings for simultaneously shifting both of the reflectors.

5. The combination of a pair of headlight casings, a pair of reflectors shiftably supported therein, a pair of eccentrics connected to said reflectors, a rod comprising a pair of members coupled together and connecting said eccentrics, and means for operating the rod.

6. The combination of a pair of headlight casings, a pair of reflectors shiftably supported therein, a pair of eccentrics connected to said reflectors, a rod comprising a pair of members coupled together and connecting said eccentrics, and electrically operative means located in one of the casings for simultaneously shifting both of the reflectors.

7. The combination of a pair of headlight casings, a pair of reflectors shiftably supported therein, means operatively connecting the reflectors for simultaneous movement downwardly and upwardly and including a pair of eccentrics connected with said reflectors, and means for operating said eccentrics thereby to shift the reflectors simultaneously.

8. The combination of a pair of headlight casings, a pair of reflectors pivotally supported therein, a pair of eccentrics connected to said reflectors, a rod comprising a pair of members coupled together, said rod having a flexible connection between adjacent parts thereof and connecting said eccentrics, and electrically operative means for operating the rod.

9. The combination of a pair of headlight casings, a pair of reflectors shiftably supported therein, a pair of eccentrics connected to said reflectors, a rod connecting said eccentrics, ratchet mechanism for operating said rod, and means for operating said ratchet mechanism.

10. The combination of a pair of headlight casings, a pair of reflectors shiftably supported therein, means operatively connecting the reflectors for simultaneous movement and including a pair of eccentrics connected with said reflectors, ratchet mechanism for operating said eccentrics, and means for operating said ratchet mechanism.

11. The combination of a pair of headlight casings, a pair of reflectors shiftably supported therein, means operatively connecting the reflectors for simultaneous movement and including a pair of eccentrics connected with said reflectors, ratchet mechanism for operating said eccentrics, and electrical means located in one of the casings for operating said ratchet mechanism and thereby both of the reflectors simultaneously.

12. The combination of a pair of headlight casings, a pair of reflectors shiftably supported therein, a pair of eccentrics connected with the reflectors, means connecting said eccentrics, ratchet mechanism for operating said eccentrics, and electrical operating means for operating said ratchet mechanism.

13. The combination of a pair of headlight casings, a pair of reflectors pivotally supported therein, a pair of eccentrics connected to said reflectors, a rod connecting said eccentrics, ratchet mechanism having a part thereof located on said rod for operating said eccentrics, and means for operating said ratchet mechanism.

14. The combination of a pair of headlight casings, a pair of reflectors pivotally supported therein, a pair of eccentrics connected to said reflectors, a rod connecting said eccentrics, ratchet mechanism for operating said eccentrics, and electrically operative means located in one of the casings for operating said ratchet mechanism.

15. The combination of a pair of headlight casings, a shiftable reflector located in each of said casings for shiftable movement downwardly and upwardly, means operatively connecting the shiftable reflectors for simultaneous movement and including an eccentric located in each of said casings, and means for shifting the eccentrics and thereby the reflectors in unison and including ratchet mechanism and electrically operative means.

16. The combination of a lamp casing, a shiftable reflector therein, means for shifting said reflector and including an automatically operative make and break electrically operative means carried by the casing and comprising an electro-magnet, a shiftable plunger, means for shifting said plunger in one direction, a contact member located in the electrical circuit of the electro-magnet and in position to coöperate with the end of the plunger to make and break the circuit, and means for controlling the operation of said make and break means.

17. The combination of a lamp casing, a shiftable reflector therein supported for up and down tilting movement to prevent the glare of the light, means for shifting said reflector and including an automatically operative make and break electrically operative means located within the casing and comprising an electro-magnet, a reciprocating plunger located within said magnet, means for shifting said plunger in one direction, a contact member located in the electrical circuit of the electro-magnet and in position to coöperate with the end of said plunger to make and break the circuit, and means for controlling the operation of said make and break means.

18. The combination of a lamp casing, a shiftable reflector therein, means for shifting said reflector and including electrical means comprising a shiftable plunger, a contact member in position to contact with said plunger for making and breaking the circuit, and means for controlling the operation thereof.

19. The combination of a lamp casing, a shiftable reflector therein, means for shifting said reflector and including electrical means comprising a shiftable plunger, a contact member in position to contact with said plunger for making and breaking the circuit, means for controlling the operation thereof, a pawl shifted by the plunger, a ratchet wheel operated by the pawl, and a spring for shifting the plunger and thereby the pawl in one direction.

20. The combination of a lamp casing, a shiftable reflector therein supported for up and down tilting movement to prevent the glare of the lamp, means for shifting said reflector and including an automatically operative make and break electrically operative means carried by the casing and comprising an electro-magnet, a shiftable core shifted by the magnet in one direction, spring controlled means for shifting the core in the opposite direction, and contact means located in the electrical circuit of the electro-magnet and coöperating with one end of the shiftable core to make and break the circuit.

21. The combination of a lamp casing, a shiftable reflector therein, means for shifting said reflector and including an automatically operative make and break electrically operative means carried by the casing, a companion lamp casing also having a shiftable reflector, and means extending from one casing to the other whereby the reflectors may be operated simultaneously by the one make and break means.

22. The combination of a lamp casing, a shiftable reflector therein, means for shifting said reflector and including an automatically operative make and break electrically operative means carried within the casing, a companion lamp casing also having a shiftable reflector, and means connecting the reflector operating means of the first reflector with the second reflector whereby both reflectors are operated simultaneously by the one make and break means.

23. The combination of a lamp casing, a shiftable reflector therein supported for up and down tilting movement to prevent the glare of the lamp, means for shifting said reflector and including a make and break electrically operative means, a companion lamp casing and shiftable reflector, and means connecting the reflector operating means of the first reflector with the second reflector and including an eccentric.

24. The combination of a lamp casing, a shiftable reflector therein supported for up and down movement, electrically operative means for shifting said reflector and comprising a motor having a shiftable core, a pawl, said core and pawl having one a part projecting into the other, a ratchet wheel operated by said pawl, means for shifting the core in one direction, contact means located in the electrical circuit of the electromagnet and coöperating with the core to make and break the circuit, and means connecting said ratchet wheel with the reflector.

25. The combination of a lamp casing, a shiftable reflector therein, a shaft, an eccentric mounted on said shaft and connected with the reflector, means for rotating the shaft and thereby the eccentric to shift the reflector and including a member also mounted on said shaft in parallelism with said eccentric.

26. The combination of a lamp casing, a shiftable reflector therein, a shaft, an eccentric mounted on the end of said shaft, a strap encircling said eccentric and connected with the reflector, means for rotating the shaft and thereby the eccentric to shift the reflector and including a member also mounted on said shaft in parallelism with said eccentric but spaced laterally therefrom.

27. The combination of a lamp casing, a shiftable reflector therein, an eccentric connected with the reflector, a ratchet wheel for operating the eccentric, a pawl for operating the ratchet wheel, electrically operative means for operating the pawl and comprising an electro-magnet having a make and break shiftable core, and a spring for shifting the pawl in one direction.

28. The combination of a lamp casing, a shiftable reflector therein, an eccentric connected with the reflector, a ratchet wheel for operating the eccentric, a pawl for operating the ratchet wheel, electrically operative means for operating the pawl and comprising an electro-magnet having a make and break shiftable core, a spring for shifting the pawl in one direction, and a pawl for preventing movement of the ratchet wheel in one direction.

29. The combination of a casing, a shiftable reflector therein, a shaft, an eccentric mounted on said shaft and connected with the reflector, a ratchet wheel also mounted on said shaft in parallelism with said eccentric for rotating the shaft and thereby the eccentric to shift the reflector, a pawl for actuating said ratchet wheel, and means for operating said pawl.

30. The combination of a lamp casing, a shiftable reflector therein, a shaft, an eccentric mounted on said shaft, a strap encircling said eccentric and connected with the reflector, a ratchet wheel also mounted on said shaft in parallelism with said eccentric but spaced laterally therefrom for rotating the shaft and thereby the reflector, a pawl for actuating said ratchet wheel, and electrically operative means for actuating said pawl.

31. The combination of a lamp casing, a shiftable reflector therein, means for shifting the reflector and comprising an eccentrically supported device connected with the reflector, a ratchet wheel connected with the eccentric, a pawl for operating the ratchet wheel, an electro-magnet, and a pair of make and break contact members located in the electrical circuit of the electro-magnet, one having connection with the core of said magnet and coöperating with the other contact member to make and break the circuit.

Signed at Cleveland, county of Cuyahoga and State of Ohio, this 29th day of November, one thousand nine hundred and sixteen.

WILLIAM M. HORTON.